Hodge et al.

United States Patent [19]

[11] 3,891,615

[45] June 24, 1975

[54] RECOVERY OF BACITRACIN AS THE CALCIUM OR MAGNESIUM COMPLEX OF AN ALKYLBENZENESULFONIC ACID

[75] Inventors: Edward B. Hodge, Terre Haute, Ind.; John A. Riddick, Baton Rouge, La.

[73] Assignee: Commercial Solvents Corporation, Terre Haute, Ind.

[22] Filed: Oct. 25, 1973

[21] Appl. No.: 409,537

[52] U.S. Cl.............................. 260/112.5; 424/177
[51] Int. Cl....C07c 103/52; C07g 7/00; A61k 27/00
[58] Field of Search................................. 260/112.5

[56] References Cited
UNITED STATES PATENTS

| | | | |
|---|---|---|---|
| 2,903,357 | 9/1959 | Zorn............................... | 260/112.5 |
| 2,915,432 | 12/1959 | Chaiet et al. .................... | 260/112.5 |
| 2,960,437 | 11/1960 | Friedman et al................. | 260/112.5 |
| 3,205,137 | 9/1965 | Lewis et al....................... | 260/112.5 |
| 3,384,631 | 5/1968 | Kalina et al...................... | 260/112.5 |
| 3,441,646 | 4/1969 | Baldwin........................... | 260/112.5 |

*Primary Examiner*—Lewis Gotts
*Assistant Examiner*—Reginald J. Suyat
*Attorney, Agent, or Firm*—Robert H. Dewey; Howard E. Post

[57] ABSTRACT

A process for the recovery of bacitracin from a fermented beer containing it by adding sodium alkylbenzenesulfonate in the presence of alkaline earth metal ions, separating the precipitate formed thereby,, dissolving in a lower aliphatic alcohol, treating with an ion-exchange resin to remove the alkylbenzenesulfonate, and recovering bacitracin by evaporation. The alkaline earth metal bacitracin alkylbenzenesulfonate complex has antibiotic activity and is useful as such.

11 Claims, No Drawings

RECOVERY OF BACITRACIN AS THE CALCIUM OR MAGNESIUM COMPLEX OF AN ALKYLBENZENESULFONIC ACID

BACKGROUND OF THE INVENTION

This invention relates to a bacitracin complex and an improved process for the recovery of bacitracin from a fermented beer containing it. In a particular aspect this invention relates to a process for the recovery of bacitracin as an insoluble complex of an alkylbenzene sulfonic acid.

Bacitracin is a valuable antibiotic useful by topical application and by oral administration for gastro-intestinal disorders of bacterial origin. It is obtained by the cultivation of Bacillus subtilis or Bacillus licheniformis on a nutrient fermentation medium.

Bacitracin is a polypeptide which forms salts and complexes with a variety of materials as is known in the art. For example, Kalina et al, U.S. Pat. No. 3,384,631 disclosed a method for precipitating bacitracin as a complex with zinc, cobalt, manganese or copper and an organic sulfate or sulfonate.

SUMMARY OF THE INVENTION

It is an object of this invention to provide an improved process for the recovery of bacitracin from a fermented beer containing it.

It is another object of this invention to provide a process for recovery of bacitracin as an insoluble complex of a sulfonic acid.

It is yet another object of this invention to provide a bacitracin complex having an unusual antibiotic spectrum.

Other objects of this invention will be apparent to those skilled in the art from the disclosure herein.

It is the discovery of this invention to provide an improved process for the recovery of bacitracin from a filtered, fermented beer containing it by adding thereto alkylbenzenesulfonic acid or a salt thereof in the presence of a divalent metal ion, adjusting the pH to about 3.0 to 4.5 thereby precipitating the metal bacitracin alkylbenzenesulfonate complex, separating the precipitate, dissolving in a lower alkanol of from 1–4 carbon atoms, passing over an ion-exchange resin to separate the alkylbenzenesulfonate, adding water and separating the alkanol by distillation, and recovering the bacitracin by precipitation as the zinc salt or by evaporation. The improvement resides in effecting the precipitation with the alkylbenzenesulfonic acid or a salt thereof in the presence of an alkaline earth metal as the divalent metal ion. The precipitate thereby obtained has utility as an antibiotic. Surprisingly, it has an anti-bacterial and anti-fungal spectrum significantly different from bacitracin.

DETAILED DISCUSSION

Bacitracin is produced by the cultivation of a bacitracin-producing organism, e.g. B. subtilis, on a nutrient medium which usually contains some calcium or magnesium ions. When the fermentation is complete, the resulting beer is filtered to separate the mycelia and the pH is adjusted to within the range of 3.0 to 4.5 with a suitable acid, many of which are known, e.g. acetic, hydrochloric or sulfuric acid. The concentration of calcium and magnesium is either estimated, based on the amount initially used, or is determined by any suitable test, method, many of which are known. Similarly the beer is assayed for bacitracin content. It is usually present in a concentration of about 150–170 units/ml. Generally there is sufficient alkaline earth metal ions, e.g. calcium or magnesium, to effect the precipitation. A ratio of about 0.3–5.0 g, calculated as calcium chloride, per gram of bacitracin is required. More particularly, 0.5–1.0 g of calcium or magnesium salt calculated as calcium chloride is used and 0.75 – 1.0 g is preferred. If the amount of alkaline earth metal ions is determined to be insufficient, an additional amount as needed is added as a water-soluble salt.

The amount of calcium used is fairly critical however. Even at 5 g CaCl$_2$ equivalent per gram of bacitracin, recoveries are less than at 1g/g, and at 15 g/g recoveries may be as low as 50 – 55%. On the other hand at least 0.3 g/g is required and best results are obtained at 0.75–1.0 g/g.

After the alkali metal salt has been added, the alkylbenzenesulfonic acid, preferably as the sodium salt, is added in an amount of about 4–10 g per liter of filtered beer, preferably about 5 g/l. The amount necessary varies somewhat with the beer. In general about 1 g is required for about each 33,400 units of bacitracin, or, at about 65 units/mg, 1 g is required for about each 512 mg of bacitracin. The ratio is not at all critical however, and amounts equivalent to 1 g of dodecylbenzenesulfonate (Na salt) per 800 mg bacitracin are often used. Accordingly, 1 g for 500 to about 800 mg of bacitracin is customarily used and 1 g per 800 mg bacitracin is preferred. Preferably, but not necessarily, about 10 g of diatomaceous earth filter aid per liter of beer is added and the mixture is stirred well, e.g. for about 5 minutes, and the solids are separated, e.g. by filtration, centrifigation or decantation. Recovery of bacitracin is generally from about 80–95% of that present in the beer. If filter aid is not used, the metal bacitracin alkylbenzenesulfonate complex can be recovered as is by decanting, washing with water and again decanting, followed by drying, preferably at reduced pressure. The product forms a rather pasty, gummy solid which is suitable for topical use as described hereinafter. If preferred, the product can be dissolved in a lower alkanol and treated with an ion-exchange resin to recover bacitracin alone as described hereinafter.

It is to be understood that the sodium salt of alkylbenzenesulfonic acid is generally used because of its convenience and ready availability. Other salts as well as the free acid are regarded as the practical equivalent of the sodium salt, and the practice of the invention is not limited thereto.

If filter aid was used, the bacitracin alkylbenzenesulfonate complex can be recovered by slurrying the filter cake with a lower alkanol, i.e., methanol, ethanol, isopropyl or n-propyl alcohol, or butanol, including 1- and 2-butanol and 2-methyl-1-propanol, in an amount sufficient to provide about 100 ml of alcohol per 3 grams of bacitracin alkylbenzenesulfonate complex and thereby dissolve it. The preferred alcohol is anhydrous methanol but ethanol, propanol or the butyl alcohols are also useful. After dissolving the metal bacitracin alkylbenzenesulfonate complex, the filter aid is separated, e.g. by filtration, centrifugation or decantation.

Bacitracin can be recovered from the alcohol solution by passing it over an ion-exchange resin to separate the alkylbenzenesulfonate ion. Suitable ion-exchange resins include anion exchange resins, and the mixed anion-cation monobed-type resins. The latter is preferred when it is desired to simultaneously separate the alkaline earth metal ion. The anion-type is preferred when the separation of alkaline earth metal ion is deemed of no importance and also for use with methanol because this solvent gives anomalous results with the mixed type. Suitable ion-exhange resins are well known in the art and any suitable resin may be used. It is not intended to limit the practice of the invention to any particular resin.

The bacitracin is recovered from the alcoholic solution thereby obtained by adding thereto an excess of water and distilling to separate the alcohol. If the alcohol is an azeotrope-former, sufficient water is added to form the azeotrope with the alcohol which is distilled, preferably at reduced pressure, to remove same. For example, isopropyl alcohol forms an azeotrope consisting of about 91% alcohol and 9% water. About 10 g of water per 100 g of solution is the minimum required to free the solution from alcohol but usually 20–30 g will be used. Similarly, the other alkanols except methanol form an azeotrope with water as is known.

The bacitracin is then recovered from the aqueous solution by known methods, e.g. by freeze-drying or by precipitation as the zinc salt.

The calcium and magnesium salts useful in the practice of this invention can be any water-soluble salt. Generally, however, the preferred salts are the chlorides, the nitrates, the acetates, or, in the case of magnesium, also the sulfate. Either calcium or magnesium salts, or a mixture thereof can be used, but calcium chloride is preferred.

The sodium alkylbenzenesulfonate suitable for the practice of this invention is selected from those wherein the alkyl group contains from 10 to 14 carbon atoms. Mixtures of $C_{10}$–$C_{14}$ alkylbenzenesulfonates are also suitable. The preferred compound is sodium dodecylbenzenesulfonate. The calcium bacitracin dodecylbenzenesulfonate complex has valuable antibiotic properties and is useful for topical treatment of diseases in animals caused by micro-organisms susceptible to it. Surprisingly, calcium bacitracin dodecylbenzenesulfonate has a different anti-microbial spectrum than bacitracin alone. It is more effective against some organisms and especially surprising is that it has anti-fungal activity.

Calcium bacitracin dodecylbenzenesulfonate complex, which has a potency of about 20 units/mg, can be applied topically as a solution in ethanol or isopropyl alcohol. Preferably, however, it is incorporated in an ointment base, e.g. petroleum jelly, in a suitable concentration, e.g. 500–1,000 units/g (25–50 mg/g). Such a preparation is useful when applied to an area of an animal infected with a susceptible organism. Other topical preparations will be obvious to those skilled in the art and it is not intended that the invention be limited to any particular one.

The invention will be better understood with reference to the following examples. It is understood, however, that the examples are intended only for illustration and it is not intended that the invention be limited thereby.

EXAMPLE 1

A batch of filtered fermented beer assayed 200 units/ml of bacitracin. Calcium and magnesium ions were known to be present in the beer, but the concentration was neither estimated nor determined. The beer was divided into two portions. One portion, (a), was adjusted to pH 3.5 and the other, (b), to pH 4.5, using concentrated sulfuric acid. To each portion was added sodium dodecylbenzenesulfonate as a 25% aqueous solution in an amount of 5 g per liter of beer. The mixture was stirred well to dissolve the sulfonate salt, 10 g/liter of filter aid was added, and the mixture was filtered. The filtrate assayed 1.8 unit/ml of bacitracin for (a) and zero for (b).

The precipitates were air dried at room temperature, weight 10.6 g for each. The precipitate from (a) assayed 8.3 units/mg, for a yield of 88%, and that from (b) assayed 8.7 units/mg for a yield of 93%. A sample of each was heated at 105°C for 24 hours to determine stability; average loss was 21%, comparable to zinc bacitracin.

The bacitracin dodecylbenzenesulfonate complex was soluble in acetone, methanol, ethanol, isopropyl alcohol and butanol. A stock solution of 200 units per ml in acetone was prepared and tested for anti-bacterial and anti-fungal activity compared with bacitracin itself. Dilutions were made with a 1:1 by volume mixture of acetone and water. The results obtained are as follows:

| Microorganism | Inhibitory End Points (u/ml) | |
| --- | --- | --- |
| | Bacitracin Dodecylbenzene-sulfonate | Bacitracin |
| Gaffkya tetragena | 0.1–0.5 | 0.01–0.05 |
| Micrococcus flavus | 0.01–0.05 | 0.005–0.01 |
| Staphylococcus aureus | 0.1–1.0 | 1–5 |
| Streptococcus fecalis | <0.1–0.5 | 1–5 |
| Streptococcus hemolyticus | <0.1–0.5 | 0.5–1.0 |
| Bacillus mycoides | 0.5–1.0 | >20 |
| Bacillus subtilis | 0.5–1.0 | >20 |
| Bodenheimer's bacillus | 0.5–1.0 | >20 |
| Pseudomonas aeruginosa | >100 | >100 |
| Shigella dysenteriae | 0.1–0.5 | — |
| Mycobacterium ranae | 0.1–0.5 | — |
| Aspergillus niger | 50–100 | >200 |
| Candida albicans | 10–50 | >200 |
| Penicillium species | 10–50 | >200 |
| Aspergillus fumigatus | 10–50 | >200 |

It was very surprising to find that the antibiotic spectrum of the calcium bacitracin dodecylbenzenesulfonate complex differed significantly from bacitracin itself, especially with respect to the anti-fungal activity. It was also surprising that some organisms were much more susceptible to the complex than to the free bacitracin.

Bacitracin was recovered from the calcium dodecylbenzenesulfonate complex by dissolving a 3 gram portion in 100 ml of methanol and passing it over 50 g of a mixed anioniccationic monobed-type ion-exchange resin. The amount of bacitracin present in the liquid phase after the resin treatment was 84% of the amount started with. It was diluted with 25 ml of water and concentrated by evaporation to 20 ml to free it from methanol. The bacitracin is recovered by freeze-drying.

EXAMPLES 2-9

The experiment of Example 1 was repeated in all essential details to the recovery stage. The recovery procedures are described below. The data are given in the following table:

| Example Number | Bacitracin in beer, units/ml | pH Adjusted to | Bacitracin in filtrate, units/ml | Bacitracin in solid, units/mg | Recovery % |
|---|---|---|---|---|---|
| 2 | 214 | 3.0 | 42 | 9.1 | 74 |
| 3 | 214 | 3.5 | 1.9 | 10.6 | 92 |
| 4 | 214 | 4.0 | 13.4 | 10.6 | 80 |
| 5 | 177 | 3.8 | 1 | 8.2 | 85 |
| 6* | 177 | 3.8 | 0 | 6.7 | 93 |
| 7 | 248 | 4.0 | 0 | 12.3 | 86 |
| 8 | 244 | 4.0 | — | 11.8 | 93 |
| 9 | 196 | — | — | 9.5 | 95 |

*4 g/100 ml of sodium dodecylbenzenesulfonate.

The solids in the fifth column above included the filter aid. The figures for recovery are based on the bacitracin in the bacitracin dodecylbenzenesulfonate complex.

In Example 2, an attempt was made to recover the bacitracin from the precipitate in accordance with Example 1 except that the methanol solution was treated with activated charcoal before being passed over the resin bed. No bacitracin was recovered due to inactivation. The experiment was repeated several times without the charcoal treatment, but little or no bacitracin was recovered.

In Example 3, a 3 g portion of the bacitracin dodecylbenzenesulfonate complex was dissolved in 100 ml isopropyl alcohol by stirring 30 minutes. It was filtered and passed over 50 g of the mixed anionic-cationic monobedtype resin. Water, 30 ml, was added and the solution was concentrated by evaporation to 20 ml. Recovery was 88% of that present in the starting precipitate. The bacitracin is recovered by freeze-drying.

In Example 4, a 2 g portion of the bacitracin dodecylbenzenesulfonate complex was dissolved in 100 ml of methanol. There was then added with stirring 40 g of an anion exchange resin and 0.2 g of activated charcoal. The mixture was stirred well and filtered. Water, 25 ml, was added to the filtrate and the mixture was concentrated by evaporation to 20 ml. Recovery of bacitracin was 68%.

EXAMPLE 10

A solution of 1.00 g of bacitracin dissolved in 250 ml of water was prepared. Sodium dodecylbenzenesulfonate, 5.0 g, was added thereto and was stirred until dissolved. The pH was adjusted to 3.4 with phosphoric acid and 1.0 g of magnesium chloride ($MgCl_2 \cdot H_2O$) dissolved in 25 ml of water was added. The resulting mixture was stirred 5 minutes and the precipitate was allowed to settle. A sample of the supernatant liquid was withdrawn for assay. It was determined that 6 units/ml of bacitracin, about 3% of the original amount, remained dissolved. The supernatant liquid was decanted and discarded. The precipitate, the magnesium dodecylbenzenesulfonate complex was washed and dried.

The bacitracin is recovered from the complex by dissolving a portion in isopropyl alcohol, passing it over an ion-exchange resin as set forth in Example 1, and after concentrating by evaporation, drying the bacitracin by freeze-drying.

EXAMPLE 11

The calcium bacitracin dodecylbenzenesulfonate complex was incorporated into chicken feed rations at a concentration equal to 50 g of bacitracin per ton of feed. Two groups of day old broiler chicks were placed on litter infected with the necrotic enteritis-producing organism (or agent). The litter was known to have been infected because it had been previously used with birds that displayed the disease. At the first sign of disease, one group (the "treatment" group) was fed a diet containing the complex and the other group, the control group, received the same rations but without the complex or other medication. The test was continued for 7.5 weeks.

The results are summarized as follows:

| Group | Weight Gain, per Bird, lb. | Feed Consumed, per Bird, lb. | Necrotic Enteritis, % Mortality |
|---|---|---|---|
| Controls | 3.86 | 8.01 | 5.0% |
| Treatment | 3.83 | 7.98 | 1.7 |

These results show that the complex is useful in treating outbreaks of necrotic enteritis in broiler chicks.

EXAMPLE 12

The experiment of Example 11 is repeated in all essentail details except that magnesium bacitracin dodecylbenzenesulfonate is substituted for the calcium complex. The magnesium complex is effective against necrotic enteritis.

We claim:

1. An alkaline earth metal-bacitracin-alkylbenzenesulfonate complex wherein said metal is calcium or magnesium and the alkyl group contains from 10 to 14 carbon atoms.

2. The complex of claim 1 wherein said alkaline earth metal is calcium.

3. The complex of claim 1 wherein said alkaline earth metal is magnesium.

4. The complex of claim 1 wherein said alkyl is the dodecyl radical.

5. In a process for the recovery of bacitracin from a filtered fermented beer containing it by the steps of adding to said beer alkylbenzenesulfonic acid or a salt thereof in a proportion of about 4–10 g/liter of said beer in the presence of a divalent metal ion, adjusting the pH to about 3–4.5 thereby obtaining a precipitate of metal-bacitracin-alkylbenzenesulfonate, separating said precipitate, dissolving said precipitate in an alkanol of from one to four carbon atoms, contacting the solution thereby obtained with an anionic or mixed anionic and cationic ion-exchange resin thereby adsorbing the metal and the alkylbenzenesulfonate ion, and forming an alcoholic solution of bacitracin, adding water to said solution and removing said alcohol by evaporation, and recovering said bacitracin, the improvement comprising using as said divalent metal ion a water-soluble salt of calcium or magnesium in an amount equivalent to about 0.3 g to about 5.0 of calcium chloride per gram of bacitracin in said beer.

6. The process of claim 5 wherein said alkaline earth metal salt is present in an amount equivalent to about 0.5 to about 1.0 g of calcium chloride per gram of bacitracin.

7. The process of claim 6 wherein said alkaline earth metal salt is present in an amount equivalent to about 0.75 to about 1.0 g of calcium chloride per gram of bacitracin.

8. The process of claim 5 wherein said divalent metal ion is provided by a water-soluble calcium salt.

9. The process of claim 5 wherein said divalent metal ion is provided by a water-soluble magnesium salt.

10. The process of claim 5 wherein said alkylbenzenesulfonic acid is dodecylbenzenesulfonic acid or a salt thereof.

11. The process of claim 5 wherein said alkylbenzenesulfonic acid is added in an amount equal to about 1 g of the sodium salt thereof per about 500 mg to about 800 mg of bacitracin.

* * * * *